S. T. WHITTIER
Odometer.

No. 201,901. Patented April 2, 1878.

WITNESSES
Frank G. Parker.
F. F. Raymond 2d.

INVENTOR
Stephen T. Whittier

UNITED STATES PATENT OFFICE.

STEPHEN T. WHITTIER, OF EAST CORINTH, MAINE.

IMPROVEMENT IN ODOMETERS.

Specification forming part of Letters Patent No. 201,901, dated April 2, 1878; application filed June 25, 1877.

*To all whom it may concern:*

Be it known that I, STEPHEN T. WHITTIER, of East Corinth, in the county of Penobscot and State of Maine, have invented an Improvement in Speed-Indicators or Odometers, of which the following is a specification:

This invention has for its object the following-described mechanism for indicating the number of miles traveled by a car or vehicle, or the number of revolutions or vibrations of any given part of a machine to which the mechanism is attached. It also indicates the rate of speed of the car, vehicle, or machine by sounding an alarm after a given number of revolutions or vibrations have occurred.

Reference is made to the accompanying drawings, forming a part of this specification, in explaining the nature of my invention, in which—

Figure 1:
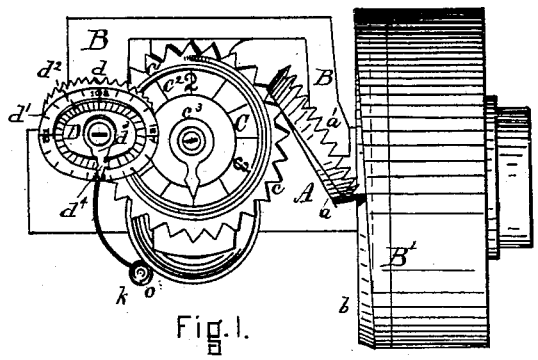
Figure 3:
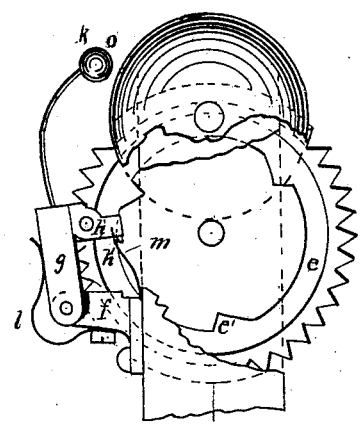
Figure 2:
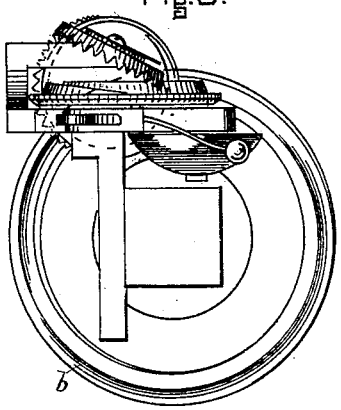

Figure 1 is a plan view; Fig. 2, an end elevation; and Fig. 3, a plan of the under portion, when reversed, of my device.

A crown-wheel, A, provided with the snail $a$ upon its side, at or near its outer edge, is pivoted to the standard B, so that the teeth $a'$ of the wheel shall engage with snail $b$, formed on the side of the hub-plate B', or be operated by some equivalent contrivance for causing said wheel to turn the distance between two teeth at every revolution or reciprocation of the mechanism actuating it. The snail $a$ engages with the teeth $c$ on wheel C, which has upon its upper surface a snail, $c^1$, surrounding a dial, $c^2$, and an index, $c^3$. This dial is properly graduated to indicate a certain number of miles traveled, or the number of strokes or revolutions of any actuating mechanism.

Another crown-wheel, D, is so arranged, in relation to the wheel C, that its teeth $d$ engage with the snail $c^1$, and it is pivoted to the bracket B. It carries upon its upper face a dial, $d^1$, and a circular ratchet, $d^2$, and the index $d^3$ is provided with the pawl $d^4$, which engages with the teeth of the rack, to prevent the wheel D from being turned back to indicate a false registration.

The under surface of the wheel C is provided with the groove $e$ and cam-recesses $e'$; and a bracket, $f$, fastened to bracket B, carries the swinging arm $g$, and hinged to this arm is the arm $h$, which is provided with a projection, $h'$, that fits into and is guided by groove $e$. The arm $h$ is also provided with the hammer $k$, and the springs $l\ m$ operate to keep the projection $h'$ constantly bearing against the inner surface of the groove $e$, so that when, in the course of the revolution of the wheel C, the projection $h'$ is forced into one of the cam-recesses $e'$, the hammer $k$ strikes the gong $o$, which is fastened to arm B' of bracket B.

The wheel C is graduated to register three miles at each revolution, and strike an alarm at the end of each mile, and with every revolution of wheel D one hundred and eight miles are recorded.

The wheel A is provided with twenty-eight teeth, which is the number requisite when the diameter of the vehicle-wheel is four feet three inches+. If the diameter of the actuating-wheel is larger, a wheel with less number of teeth must be employed in lieu of wheel A, and if smaller, a wheel with a greater number of teeth.

I am aware that the patent granted J. N. Brokaw, October 31, 1876, No. 183,898, shows a contrivance for registering the revolution of wheels, which is designed to be fastened to the wheel to revolve with it, and that the said contrivance consists of a weight which, it is supposed, will hang pendent while the wheel revolves, and which, when hanging pendent, operates, through a shaft provided with a worm, a spur-wheel which is fastened to one end of a shaft, that carries at its other end a worm, that engages with the teeth of another spur-wheel, which is provided with a worm, which actuates, through a cogged rim, a revolving dial.

I am also aware that the patent granted J. A. Robinson, December 15, 1873, No. 145,527, describes a device or "way-meter for wheel-vehicles" provided with a rotary cap actuated by a spring-lever, a ratchet-wheel, an adjustable screw, a pin, an elastic lever, and various other parts, so arranged and combined that adjustability to varying sizes of wheels is effected.

I am also aware that the patent granted David L. Branning, February 28, 1871, No. 112,116, shows a mechanism for operating adjustable arms, adjustable pointers, and a bellhammer through a reducing-train of toothed wheels. But neither of the above-named patents shows a mechanism having the arrangement and combination of two crown-wheels and a spur-wheel fastened to the arm of a bracket, and adapted to be operated by a revolving snail in such a way that the snail engages with the teeth of a crown-wheel itself, provided with a face-snail that actuates a spur-wheel, having a face-snail that actuates another crown-wheel; nor do they show two revolving dials made on the face of two of the wheels of the reducing-train; nor a combination of the reducing-train with both an alarm mechanism and a device for preventing false registration, all of which is what I deem my invention.

Having thus fully described my invention, I claim and desire to secure by Letters Patent—

1. In an odometer or speed-indicator, the combination of the hub-plate, provided with the snail $b$, with the train of wheels described, the same consisting, first, of a crown-wheel so inclined in relation to the snail $b$ that its teeth mesh with it, and which is itself provided with a snail on its face, that meshes with the teeth of an inclined spur-wheel having a dial and snail on its face, which snail actuates the second crown-wheel, which is also provided with a dial, the bracket B, and the indices $c^3$ $d^2$, all arranged, in relation to each other, as set forth.

2. The combination of the wheel C, provided with groove $e$ and cam-recesses $e'$, swinging arm $h$, hinged to swinging arm $g$, and having the hammer $k$ and projection $h'$, the springs $l$ $m$, and the gong $o$, all arranged to operate as described.

STEPHEN T. WHITTIER.

Witnesses:
F. F. RAYMOND, 2d,
A. J. OETTINGER.